(12) United States Patent
Yoshitomi et al.

(10) Patent No.: US 11,052,763 B2
(45) Date of Patent: Jul. 6, 2021

(54) ELECTRIC APPARATUS AND ELECTRIC APPARATUS MODULE

(71) Applicant: HONDA MOTOR CO., LTD., Tokyo (JP)

(72) Inventors: Ryoichi Yoshitomi, Wako (JP); Takuma Kanazawa, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/656,038

(22) Filed: Oct. 17, 2019

(65) Prior Publication Data

US 2020/0122579 A1 Apr. 23, 2020

(30) Foreign Application Priority Data

Oct. 23, 2018 (JP) .............................. JP2018-198922

(51) Int. Cl.
| | |
|---|---|
| *B60L 1/00* | (2006.01) |
| *H01M 8/04111* | (2016.01) |
| *B60L 50/71* | (2019.01) |
| *H01M 8/04746* | (2016.01) |

(52) U.S. Cl.
CPC .............. *B60L 1/003* (2013.01); *B60L 50/71* (2019.02); *H01M 8/04111* (2013.01); *H01M 8/04753* (2013.01); *H01M 2250/20* (2013.01)

(58) Field of Classification Search
CPC .............. B60L 1/003; B60L 50/70–72; H01M 8/04111; H01M 8/04746; H01M 8/04753; H01M 8/04776; H01M 2250/20
See application file for complete search history.

(56) References Cited

U.S. PATENT DOCUMENTS

| | | | |
|---|---|---|---|
| 2004/0101725 A1* | 5/2004 | Kato | H01M 8/04126 429/413 |
| 2005/0032404 A1* | 2/2005 | Furuta | B60L 1/003 439/157 |
| 2005/0233191 A1* | 10/2005 | Ushio | H01M 8/04753 429/414 |
| 2006/0185915 A1* | 8/2006 | Kaneko | B60K 15/013 180/65.1 |
| 2006/0286418 A1* | 12/2006 | Saeki | H01M 8/04417 429/430 |
| 2007/0196708 A1* | 8/2007 | Yoshida | H01M 8/04723 429/429 |
| 2007/0248861 A1* | 10/2007 | Hoshi | H01M 16/006 429/435 |
| 2012/0015257 A1* | 1/2012 | Arisawa | B60L 58/31 429/400 |
| 2018/0272890 A1* | 9/2018 | Takeyama | H01M 8/04014 |

FOREIGN PATENT DOCUMENTS

JP 2014-113910 A 6/2014

* cited by examiner

*Primary Examiner* — Levi Gannon
(74) *Attorney, Agent, or Firm* — Carrier Blackman & Associates, P.C.; Jeffrey T. Gedeon; Joseph P. Carrier

(57) ABSTRACT

An electric apparatus (air pump), which operates by receiving a power supply from a drive control apparatus (PDU) mounted in a fuel cell vehicle, includes a first connection terminal section configured to directly connect to the drive control apparatus, and a second connection terminal section configured to connect to the drive control apparatus via a cable.

6 Claims, 3 Drawing Sheets

ELECTRIC APPARATUS AND ELECTRIC APPARATUS MODULE

CROSS-REFERENCE TO RELATED APPLICATION

This application is based upon and claims the benefit of priority from Japanese Patent Application No. 2018-198922 filed on Oct. 23, 2018, the contents of which are incorporated herein by reference.

BACKGROUND OF THE INVENTION

Field of the Invention

The present invention relates to an electric apparatus and an electric apparatus module that are mounted in a fuel cell vehicle.

Description of the Related Art

Conventionally, various structural layouts have been proposed for a fuel cell vehicle in which a fuel cell, a drive motor, a power supply apparatus, and accessories thereof are housed in a motor room. Among these accessories, electric devices such as an air pump and the drive motor, which are large and bulky, and a drive control apparatus that supplies the power to the electric apparatus are designed individually according to a layout that is suitable for a package configuration of each vehicle.

As an example, Japanese Laid-Open Patent Publication No. 2014-113910 discloses a configuration in which the air pump is provided at the front of the vehicle, the power supply apparatus for this air pump is arranged at a position behind the air pump, and the air pump and power supply apparatus are connected by a cable.

However, when designing the structure of the power supply apparatus individually according to the package configuration of the vehicle, there is a problem that components are not shared, which results in a high cost. For example, in a large-scale vehicle where there is plenty of space in the motor room, it is possible to adopt a structure in which the air pump and the drive control apparatus are formed integrally without using a cable, but in this case, it is necessary to prepare specialized models of the air pump and drive control apparatus, and the components cannot be shared. Furthermore, in a case where a change occurs in the package structure of the vehicle during the design phase of the vehicle, there is a problem that the layout of the electric apparatus and drive control apparatus cannot be flexibly changed.

SUMMARY OF THE INVENTION

It is an object of an embodiment of the present invention to provide an electric apparatus and an electric apparatus module that can be adopted in various layouts and enable components to be shared.

One aspect of the present invention is an electric apparatus that operates by receiving a power supply from a drive control apparatus mounted in a fuel cell vehicle, the electric apparatus comprising a first connection terminal section configured to directly connect to the drive control apparatus, and a second connection terminal section configured to connect to the drive control apparatus via a cable.

Another aspect of the present invention is an electric apparatus module comprising an electric apparatus mounted in a fuel cell vehicle, and a drive control apparatus configured to supply drive power to the electric apparatus, wherein the electric apparatus includes a first connection terminal section for direct connection, and a second connection terminal section for cable connection, and the drive control apparatus is directly connected to the first connection terminal section.

Yet another aspect of the present invention is an electric apparatus module comprising an electric apparatus mounted in a fuel cell vehicle, and a drive control apparatus configured to supply drive power to the electric apparatus, wherein the electric apparatus includes a first connection terminal section for direct connection, and a second connection terminal section for cable connection, and the drive control apparatus is connected to the second connection terminal section via a cable.

According to the electric apparatus and the electric apparatus modules according to the above aspects, a plurality of types of connection terminal sections are provided such that a plurality of layouts can be adopted on the electric apparatus side. Therefore, by using the appropriate connection terminal sections among the plurality of types of connection terminal sections depending on the situation, it is possible to select between a layout in which the electric apparatus and the drive control apparatus are directly connected and a layout in which the electric apparatus and the drive control apparatus are connected by a cable in the electric apparatus module. As a result, it is possible to arrange the electric apparatus and the electric apparatus module at suitable positions in accordance with various vehicle packages, while also using the electric apparatus as a shared component.

The above and other objects, features, and advantages of the present invention will become more apparent from the following description when taken in conjunction with the accompanying drawings, in which a preferred embodiment of the present invention is shown by way of illustrative example.

DESCRIPTION OF THE PREFERRED EMBODIMENTS

Figure 1:
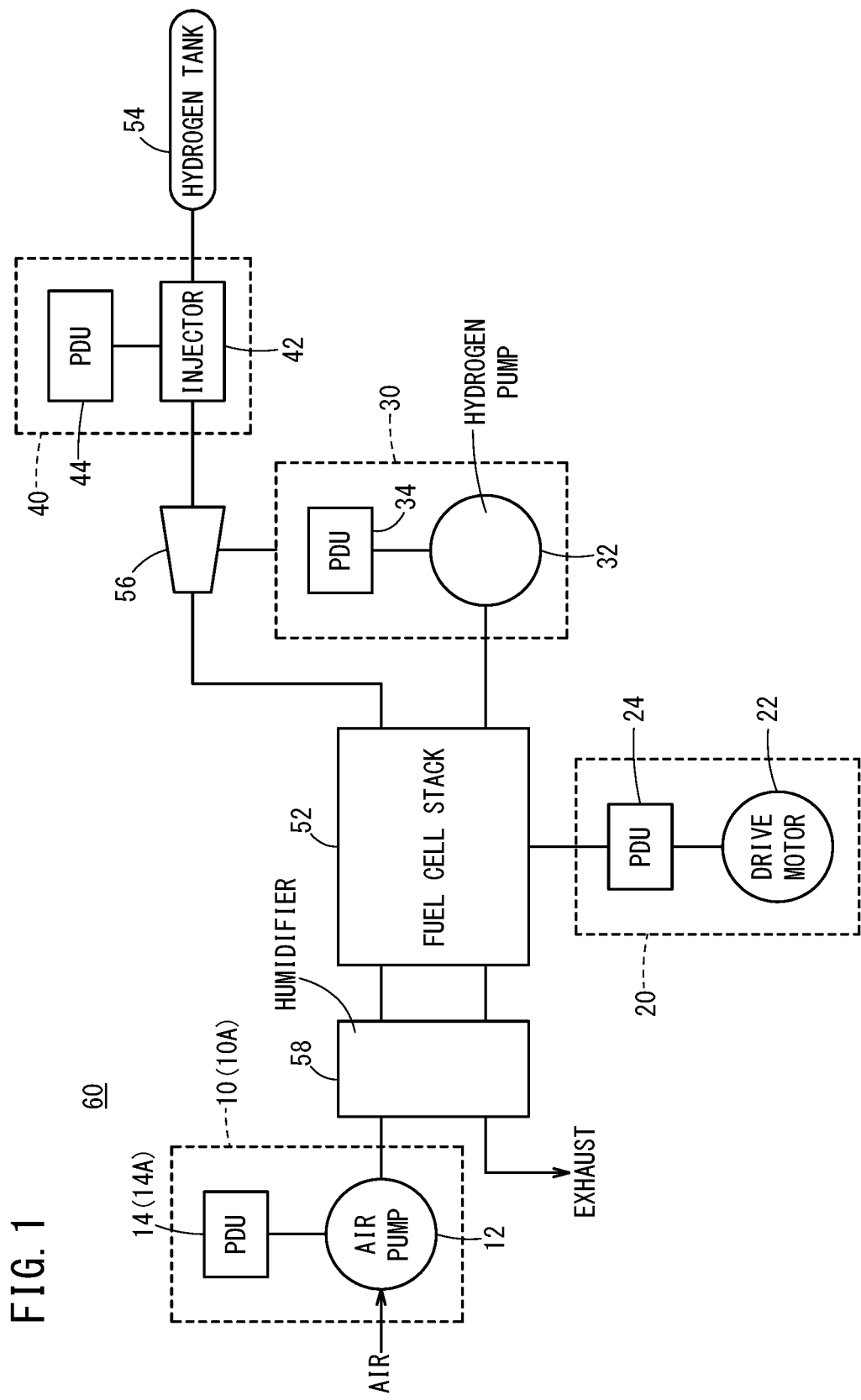
FIG. 1 is a block diagram of a fuel cell system according to an embodiment of the present invention.

The following provides a detailed description of examples of preferred embodiments of the present invention, while referencing the accompanying drawings. The dimensional ratios in the drawings are meant to be descriptive, and may be exaggerated and differ from the actual ratios.

A fuel cell system 60 according to one embodiment of the present invention is mounted in a fuel cell vehicle, for example, and supplies power to a load such as a drive motor 22.

As shown in FIG. 1, the fuel cell system 60 includes a fuel cell 52 (fuel cell stack) that generates power by causing an electrochemical reaction between an oxidant gas and a fuel gas (hydrogen) that is supplied from a hydrogen tank 54. The power of the fuel cell 52 is supplied to a vehicle drive apparatus 20. The vehicle drive apparatus 20 includes a drive motor 22 that provides rotational force to the wheels of the vehicle and a PDU 24 (power drive unit) that supplies drive power to the drive motor 22. The power drive unit 24 is connected between the fuel cell 52 and the drive motor 22, and supplies power for driving to the drive motor 22.

The fuel cell system 60 further includes, as auxiliary machinery for causing the fuel cell 52 to operate, an oxidant gas supply apparatus 10, a humidifier 58, a fuel gas supply apparatus 40, a fuel gas circulation apparatus 30, an ejector 56, and valves (not shown in the drawings) for opening and closing pipes that connect the above components.

The oxidant gas supply apparatus 10 includes an air pump 12 that pressurizes air serving as the oxidant gas and feeds this air to the fuel cell 52, and a PDU 14 (power drive unit) that supplies drive power to the air pump 12. The PDU 14 contains therein a control circuit that converts DC current supplied from a battery or the fuel cell 52 into AC current, and outputs this AC current to the air pump 12. Furthermore, the fuel gas supply apparatus 40 includes an injector 42 that pressurizes hydrogen serving as the fuel gas and feeds this hydrogen to the ejector 56, and a PDU 44 (power drive unit) that supplies drive power to the injector 42. The fuel gas circulation apparatus 30 includes a hydrogen pump 32 and a PDU 34 that supplies drive power to the hydrogen pump 32.

Figure 3A:
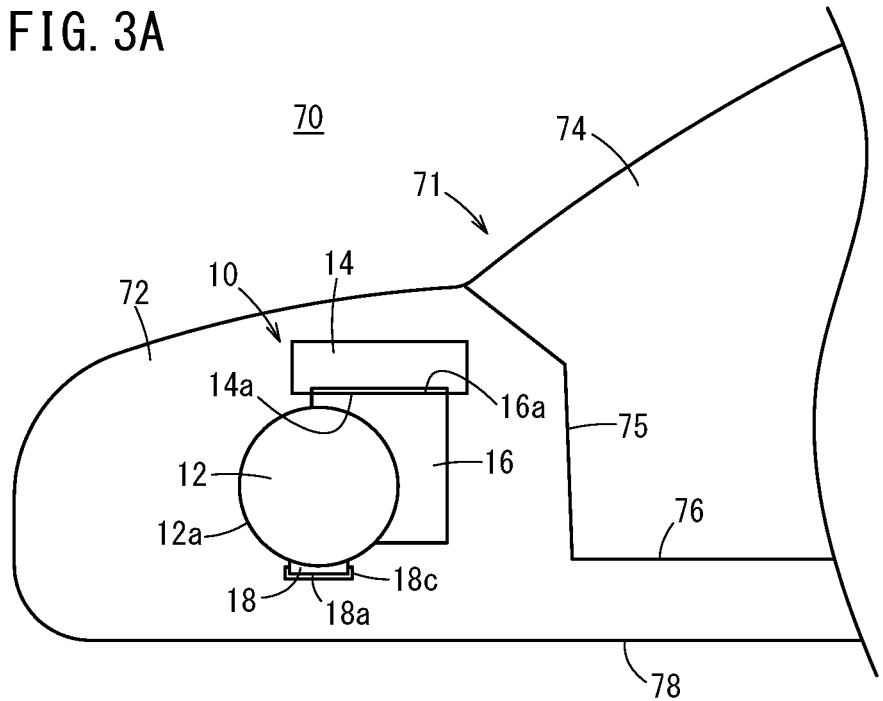
FIG. 3A is a schematic view of an example in which the air pump with the first layout is mounted in a fuel cell vehicle that as a relatively large motor room.

The fuel cell 52, the oxidant gas supply apparatus 10, the vehicle drive apparatus 20, the fuel gas circulation apparatus 30, and the fuel gas supply apparatus 40 that form the fuel cell system 60 described above are mounted along a package structure of the vehicle inside a motor room 72 of a fuel cell vehicle 70 (see FIG. 3A). The oxidant gas supply apparatus 10, which is relatively large even among these devices, is configured in a manner enabling flexible changing of the layout configuration in accordance with the size of the motor room 72 of the fuel cell vehicle 70, as described further below.

Figure 2A:
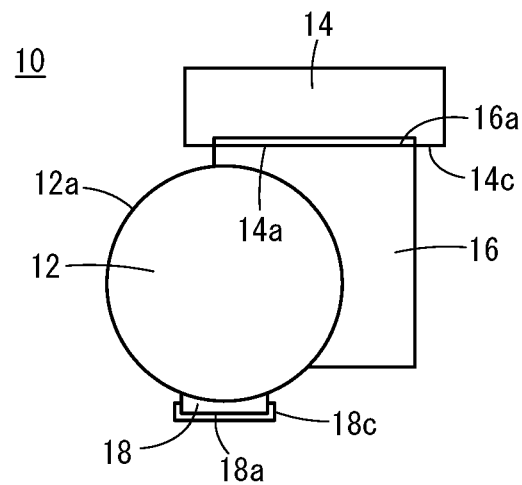
FIG. 2A is a planar view of a first layout of an air pump according to an embodiment of the present invention.

As shown in FIG. 2A, the air pump 12 (electric apparatus) of the oxidant gas supply apparatus 10 includes a housing 12a that houses therein a motor and a compressor and has a cylindrical shape centered on the rotational axes of these components. A side portion of the housing 12a is provided with a first connection terminal section 16 that extends toward a top portion thereof. A terminal surface 16a facing upward is formed on the first connection terminal section 16. Furthermore, a direct connection terminal section 14a is provided on a bottom surface 14c of the first PDU 14 (drive control apparatus), on a portion of the bottom surface corresponding to the terminal surface 16a of the first connection terminal section 16. The direct connection terminal section 14a includes a connection terminal corresponding to the terminal surface 16a.

Figure 2B:
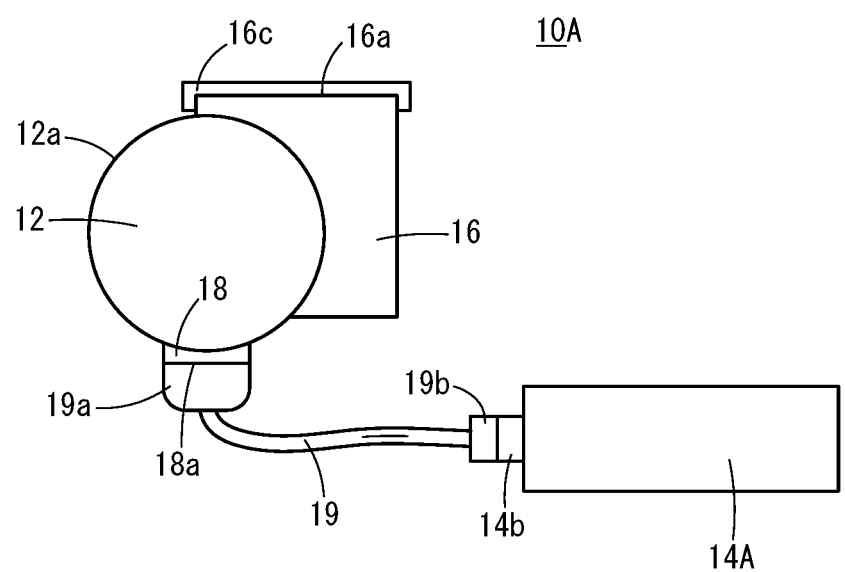
FIG. 2B is a planar view of a second layout of an air pump according to an embodiment of the present invention.

As shown in FIG. 2B, a second connection terminal section 18 for connecting a cable 19 is formed on a bottom end portion of the housing 12a of the air pump 12. A terminal surface 18a facing downward is formed on the second connection terminal section 18. A first connector 19a is provided on one end of the cable 19, and a second connector 19b is provided on the other end of the cable 19. The first connector 19a has a terminal arrangement corresponding to the terminal arrangement of the terminal surface 18a, and the cable 19 is connected to the second connection terminal section 18 by connecting the first connector 19a to the terminal surface 18a.

In order to increase the mechanical connection strength with the first PDU 14, the surface area of the terminal surface 16a of the first connection terminal section 16 is preferably formed to be greater than the surface area of the terminal surface 18a of the second connection terminal section 18.

A connector receiving portion 14b for connecting the cable 19 is provided to a second PDU 14A. The connector receiving portion 14b includes a terminal capable of connecting to the second connector 19b of the cable 19. The second PDU 14A is capable of electrically connecting to the cable 19, via the connector receiving portion 14b.

As shown in FIG. 2A, in the oxidant gas supply apparatus 10 according to the first layout, the direct connection terminal section 14a of the first PDU 14 is connected to the first connection terminal section 16 of the air pump 12. Therefore, the first PDU 14 is directly connected, electrically and mechanically, to the top of the air pump 12, without having the cable 19 interposed therebetween. In this way, in the first layout, the first PDU 14 is mounted directly on and connected integrally to the top of the air pump 12 of the oxidant gas supply apparatus 10. In the first layout, the first PDU 14 and the air pump 12 are connected with the shortest distance therebetween, thereby reducing power loss between the first PDU 14 and the air pump 12 and restricting the occurrence of noise.

In the oxidant gas supply apparatus 10 according to the first layout, the second connection terminal section 18 is not used. In this case, the second connection terminal section 18 is preferably protected by covering the terminal surface 18a of the second connection terminal section 18 with a cap 18c.

Further, as shown in FIG. 2B, in the oxidant gas supply apparatus 10A according to the second layout, the first connector 19a of the cable 19 is connected to the second connection terminal section 18 of the air pump 12. Furthermore, the second connector 19b of the cable 19 is connected to the connector receiving portion 14b of the second PDU 14A. In other words, the air pump 12 and the second PDU 14A are connected via the cable 19. In the second layout, the second PDU 14A can be arranged at a distance from the air pump 12, within a range that can be reached by the cable 19. In the second layout, the first connection terminal section 16 is not used. In this case, the first connection terminal section 16 is preferably protected by covering the terminal surface 16a of the first connection terminal section 16 with a cover member 16c. The following describes the operation of the oxidant gas supply apparatus 10 (electric apparatus module) according to the present embodiment configured as described above, while referencing FIGS. 3A and 3B.

As shown in FIG. 3A, in the fuel cell vehicle 70, the motor room 72 is provided in the front portion of the vehicle body 71. A dashboard 75 separating the motor room 72 from a cabin 74 is provided in the rear portion of the motor room 72. An upper floor panel 76 is connected to a bottom end portion of the dashboard 75. The upper floor panel 76 is formed across the entire vehicle body 71 in the left-right direction, and also extends along the front-back direction.

An underfloor panel 78, which forms the bottom surface of the vehicle body 71, is formed below the upper floor panel 76 to cover the upper floor panel 76. Side frames (not shown in the drawings) are formed on the left and right sides of the motor room 72, and the air pump 12 is attached to these side frames.

The fuel cell vehicle 70 includes a relatively large motor room 72, and the oxidant gas supply apparatus 10 (electric apparatus module) is mounted according to the first layout in which the first PDU 14 is directly connected to the top of the air pump 12. In other words, the air pump 12 and the first PDU 14 are connected via the first connection terminal section 16 of the air pump 12. In the oxidant gas supply apparatus 10, since the first PDU 14 and the air pump 12 are connected with the shortest distance therebetween by directly connecting the first PDU 14 to the top of the air pump 12, power loss is reduced and the occurrence of noise is restricted.

Figure 3B:
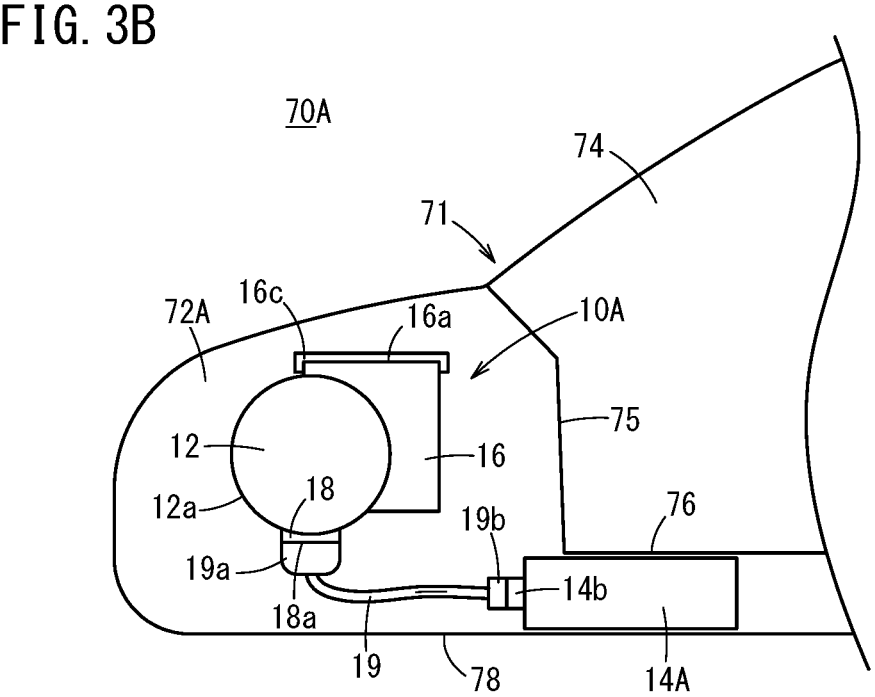
FIG. 3B is a schematic view of an example in which the air pump with the second layout is mounted in a fuel cell vehicle that as a relatively small motor room.

On the other hand, the fuel cell vehicle 70A shown in FIG. 3B is a smaller type of vehicle than the fuel cell vehicle 70 shown in FIG. 3A, and the size of the motor room 72A is less than that of the motor room 72 of FIG. 3A.

In this fuel cell vehicle 70A, the entire oxidant gas supply apparatus 10 cannot be mounted inside the motor room 72A in a state where the second PDU 14A is directly connected to the top of the air pump 12, such as in the oxidant gas supply apparatus 10 according to the first layout (see FIG. 3A). Therefore, as shown in the drawing, the oxidant gas supply apparatus 10A is mounted with the second layout, in which the air pump 12 and the second PDU 14A are separated from each other.

The air pump 12 and the second PDU 14A are connected via the cable 19. In other words, by connecting the cable 19 to the second connection terminal section 18 of the air pump 12 and the connector receiving portion 14b of the second PDU 14A, the air pump 12 and the second PDU 14A are electrically connected to each other.

The second PDU 14A is arranged in the space between the upper floor panel 76 and the underfloor panel 78, to the rear of the air pump 12. By arranging the second PDU 14A in the space between the upper floor panel 76 and the underfloor panel 78 in this way, it is possible to mount the apparatuses even in the fuel cell vehicle 70A that has a relatively narrow motor room 72A, while sharing components.

The electric apparatus and electric apparatus module according to one embodiment of the present invention realize the following effects.

The air pump 12 according to the present embodiment includes the first connection terminal section 16 that connects directly to the first PDU 14 (drive control apparatus) and the second connection terminal section 18 that connects to the second PDU 14A (drive control apparatus) via the cable 19.

With the above configuration, by selecting between the first connection terminal section 16 and the second connection terminal section 18 of the air pump 12, it is possible to select between the first layout in which the first PDU 14 is directly connected and the second layout in which the second PDU 14A is connected via the cable 19. As a result, it is possible to select the optimal layout in accordance with the size of the motor room 72 or 72A. Furthermore, there is no need to change the structure of the air pump 12 when changing the layout, and so components can be shared.

In the air pump 12 (electric apparatus), the first connection terminal section 16 and the second connection terminal section 18 may be arranged with different orientations from each other. As a result, it is possible to change the connection direction of the PDU 14 or 14A or the cable 19.

In the air pump 12 (electric apparatus), the surface area of the terminal surface 16a of the first connection terminal section 16 is preferably greater than the surface area of the terminal surface 18a of the second connection terminal section 18. By increasing the surface area of the terminal surface 16a of the first connection terminal section 16 that connects directly to the first PDU 14 in this way, the mechanical connection state between the first PDU 14 and the air pump 12 can be made stronger, which is favorable.

The oxidant gas supply apparatus 10 (electric apparatus module) according to the present embodiment includes the air pump 12 (electric apparatus) mounted in the motor room 72 or 72A of the fuel cell vehicle 70 or 70A, and the PDU 14 or 14A (drive control apparatus) that supplies power to the air pump 12 (electric apparatus). The air pump 12 (electric apparatus) includes the first connection terminal section 16 that connects directly to the first PDU 14 (drive control apparatus) and the second connection terminal section 18 that connects to the second PDU 14A (drive control apparatus) via the cable 19. The first PDU 14 is connected directly to the first connection terminal section 16 of the air pump 12. With the above configuration, it is possible to realize the first layout in which the air pump 12 and the first PDU 14 are connected integrally, without the cable 19. By connecting the first PDU 14 integrally to the top of the air pump 12, the first PDU 14 and the air pump 12 are connected with the shortest distance therebetween, and so it is possible to restrict power loss and also to restrict noise.

The oxidant gas supply apparatus 10A (electric apparatus module) according to the present embodiment includes the air pump 12 (electric apparatus) mounted in the motor room 72 or 72A of the fuel cell vehicle 70 or 70A, and the PDU 14 or 14A (drive control apparatus) that supplies power to the air pump 12 (electric apparatus). The air pump 12 (electric apparatus) includes the first connection terminal section 16 that connects directly to the first PDU 14 (drive control apparatus) and the second connection terminal section 18 that connects to the second PDU 14A (drive control apparatus) via the cable 19. The second PDU 14A (drive control apparatus) is connected to the second connection terminal section 18 via the cable 19. With the above configuration, it is possible to realize the second layout in which the second PDU 14A can be arranged at a position distanced from the air pump 12.

In the oxidant gas supply apparatus 10A (electric apparatus module), the second PDU 14A (drive control apparatus) may be arranged below the upper floor panel 76 of the cabin 74 of the fuel cell vehicle 70A. By adopting such a layout, it is possible to mount the oxidant gas supply apparatus 10A even in the relatively small motor room 72A, without making design changes. Furthermore, by arranging the second PDU 14A (drive control apparatus) below the upper floor panel 76 of the cabin 74 of the fuel cell vehicle 70A, it is possible to make the center of gravity of the fuel cell vehicle 70A lower.

The above describes an example of the oxidant gas supply apparatus 10, but the present embodiment is not limited to this. For example, in the vehicle drive apparatus 20 including the drive motor 22 and the PDU 24, and in the fuel gas supply apparatus 40 including the injector 42 and the PDU 44 as well, a plurality of types of connection terminal sections may be provided such that a plurality of layout configurations can be adopted.

While the preferred embodiments of the present invention have been described above, the present invention is not limited to the above described embodiments. It is apparent that various alterations and improvements can be added to the above-described embodiments, without deviating from the technical scope of the invention.

What is claimed is:

1. An electric apparatus that operates by receiving a power supply from one of a first drive control apparatus and a second drive control apparatus mounted in a fuel cell vehicle, the electric apparatus comprising:
- a first connection terminal section configured to directly connect to the first drive control apparatus and having a first terminal surface conforming to a shape of a direct connection terminal section of the first drive control apparatus; and
- a second connection terminal section configured to connect to the second drive control apparatus via a cable and having a second terminal surface conforming to a shape of a connector of the cable,
- wherein the first connection terminal section provides a first electrical connection between the electric apparatus and the first drive control apparatus for receiving the power supply therefrom, and
- wherein the second connection terminal section provides a second electrical connection between the electric apparatus and the second drive control apparatus for receiving the power supply therefrom.

2. The electric apparatus according to claim 1, wherein the first connection terminal section and the second connection terminal section are oriented in different directions from each other.

3. The electric apparatus according to claim 1, wherein a surface area of a terminal surface of the first connection terminal section is greater than a surface area of a terminal surface of the second connection terminal section.

4. The electric apparatus according to claim 1, wherein the electric apparatus is an air pump.

5. An electric apparatus module comprising:
- an electric apparatus mounted in a fuel cell vehicle; and
- a drive control apparatus configured to supply drive power to the electric apparatus, wherein
- the electric apparatus includes a first connection terminal section selectably connected directly with the drive control apparatus by way of a first terminal surface conforming to a shape of a direct connection terminal section of the drive control apparatus, and a second connection terminal section selectably connected via cable connection with the drive control apparatus by way of a second terminal surface conforming to a shape of a connector of a cable,
- the drive control apparatus is connected to the second connection terminal section via the cable,
- wherein the first and second connection terminal sections respectively provide first and second electrical connections between the electric apparatus and the drive control apparatus for receiving the drive power therefrom.

6. The electric apparatus module according to claim 5, wherein
- the electric apparatus is an air pump,
- the drive control apparatus is electrically connected to the air pump via the cable, and
- the drive control apparatus is arranged below an upper floor panel of a cabin of the fuel cell vehicle.

* * * * *